(12) United States Patent
Cacciaguerra

(10) Patent No.: US 8,220,154 B2
(45) Date of Patent: Jul. 17, 2012

(54) METHOD FOR FABRICATING AN AIRCRAFT FUSELAGE IN COMPOSITE MATERIAL

(75) Inventor: Bruno Cacciaguerra, Clermont le Fort (FR)

(73) Assignee: Airbus Operations SAS, Toulouse (FR)

( * ) Notice: Subject to any disclaimer, the term of this patent is extended or adjusted under 35 U.S.C. 154(b) by 701 days.

(21) Appl. No.: 12/158,214

(22) PCT Filed: Dec. 19, 2006

(86) PCT No.: PCT/FR2006/051385
§ 371 (c)(1),
(2), (4) Date: Jun. 24, 2008

(87) PCT Pub. No.: WO2007/071879
PCT Pub. Date: Jun. 28, 2007

(65) Prior Publication Data
US 2009/0020645 A1  Jan. 22, 2009

(30) Foreign Application Priority Data
Dec. 20, 2005  (FR) ..................................... 05 53972

(51) Int. Cl.
*B21D 53/88* (2006.01)
(52) U.S. Cl. .................................................. 29/897.2
(58) Field of Classification Search ............... 29/897.2
See application file for complete search history.

(56) References Cited

U.S. PATENT DOCUMENTS

| 4,633,632 | A | 1/1987 | Sarh |
| 4,717,330 | A | 1/1988 | Sarh |
| 5,170,967 | A | 12/1992 | Hamamoto et al. |
| 6,613,258 | B1 | 9/2003 | Maison et al. |
| 2008/0230652 | A1 * | 9/2008 | Bjornstad et al. ............. 244/120 |

FOREIGN PATENT DOCUMENTS

| EP | 0142697 A1 | 5/1985 |
| EP | 0444627 A1 | 9/1991 |
| FR | 2766407 A1 | 1/1999 |
| JP | 61169394 A | 7/1986 |
| WO | 2006001860 A2 | 1/2006 |

OTHER PUBLICATIONS

International Search Report dated Jun. 25, 2007.
Written Opinion dated Jun. 25, 2007.

* cited by examiner

*Primary Examiner* — David Bryant
*Assistant Examiner* — Moshe Wilensky
(74) *Attorney, Agent, or Firm* — Perman & Green, LLP

(57) ABSTRACT

A method for manufacturing an aircraft fuselage includes an internal framework surrounded by an external skin made of composite material, in which the internal framework at least partially constitutes a mould for manufacture and/or the support for the mould for the external skin made of composite material. The disclosed embodiments also relate to an aircraft fuselage produced using this method.

8 Claims, 2 Drawing Sheets

METHOD FOR FABRICATING AN AIRCRAFT FUSELAGE IN COMPOSITE MATERIAL

CROSS REFERENCE TO RELATED APPLICATIONS

This application is the National Stage of International Application No. PCT/FR2006/051385. International Filing Date, 19 Dec. 2006, which designated the United States of America, and which international application was published under PCT Article 12 (2) as WO Publication No. WO 2007/071879, the disclosures of which are incorporated herein by reference in their entireties.

BACKGROUND

1. Field

The disclosed embodiments concern a technique for fabricating an aircraft fuselage whose outer skin is executed in composite material. The technique of the disclosed embodiments allow the outer skin to be executed, in composite material, around the internal structure of the fuselage, thus facilitating the assembly of said internal structure. The disclosed embodiments also concern an aircraft fuselage obtained by such a fabrication technique.

The disclosed embodiments find application in the field of aeronautics, and in particular in the field of fabricating aircraft fuselages.

2. Brief Description of Related Developments

The fuselage of an aircraft is the body of the aircraft. The wing surface, the vertical stabilizers, the landing gear, the engines, and numerous other elements are fastened to the fuselage. The fabrication of the fuselage thus constitutes an important step in the construction of an aircraft.

Traditionally, the fuselage of the aircraft is a hollow body executed in metal. This hollow body is composed of metal panels mounted and fastened around an internal structure, generally metal, called the internal framework of the aircraft. The metal panels are assembled with fasteners and form, once assembled, the outer skin of the aircraft. Such metal fuselages are very widespread nowadays. However, they present the disadvantage of being heavy, since the fuselage is entirely metal. Moreover, they present the disadvantage of inserting joints, between the metal panels, which constitute excess thickness. This excess thickness increases the weight and can cause drag when the aircraft is in flight, which is disruptive from the aerodynamic viewpoint.

In order to reduce the weight of the fuselage, aeronautical engineers are trying to replace some metal elements with elements made of composite materials. These composite materials are used in particular to execute one or several parts of the fuselage of the aircraft, for example for the ventral fairing of the aircraft. These parts of the fuselage are generally panels executed starting with dry fibers pre-coated with resin. These panels are fabricated by preparing sheets and/or fabric pieces made of dry fibers pre-coated with a thermoset resin, placing these sheets and/or fabric pieces in a mold and then heating the whole. Under the effect of heat, the resin polymerizes, permitting the fiber reinforcement to preserve the shape of the mold. After cooling, the mold is removed. Such a fabrication technique permits the fabrication principally of panels, that is, pieces with an open profile, since the mold has to be removed after shaping and cooling. It allows the fabrication of a hollow body with difficulty, in particular with a changing shape, for example, hollow bodies with a conical shape.

In order to allow the fabrication, in composite material, of a portion of the fuselage with a changing shape, a technique exists which consists of fabricating a section of the outer skin of the fuselage of an aircraft. This section of outer skin is achieved by wrapping sheets of fibers pre-coated with resin around a mold having the desired shape. The mold may be a hollow cylinder. The mold thus wrapped with pre-coated fiber sheets is heated on order to polymerize the resin. After cooling, the laminate obtained shapes the outer skin of the aircraft. This outer skin is detached from the mold, either by sliding or by disassembly in place and then removal from the mold. When the outer skin has been executed, the internal framework is inserted inside the outer skin, piece by piece, or in a group of basic parts positioned on complex frame structures. The internal framework of an aircraft is an assemblage of frames and other structural parts, such as beams and decking. The internal framework is thus installed by inserting each frame and structural part of the framework inside the outer skin, then by fastening each of these pieces from the inside of said outer skin. When the pieces of the internal framework are too large, they are divided up into several portions and inserted, portion by portion, into the outer skin and then fastened to each other with rivets.

Such a technique is difficult to implement due in particular to the large surface area of the outer skin to be detached from the mold. The outer skin may in addition include elements of the type presenting excess thickness which still increase the difficulties of unmolding. Moreover, this technique takes a relatively long time to implement, since it necessitates the insertion and the fastening, as basic groups, or piece by piece, or even portion by portion, of all the parts forming the internal framework, inside the outer skin.

SUMMARY

To this end, the disclosed embodiments offer a technique for fabricating an aircraft fuselage whose outer skin is of composite material and whose internal framework constitutes at least partially the mold for fabricating the outer skin, and/or the support of said mold. This technique offers the assembly of the internal framework and then the fabrication of the outer skin around the internal framework.

More precisely, the disclosed embodiments concern a technique of fabricating an aircraft fuselage comprising an internal framework wrapped with an outer skin of a composite material, characterized by the fact that the internal framework comprises at least partially a mold for fabricating the outer skin in a composite material.

This technique presents the advantage of not necessitating any installation of the internal framework after fabrication of the outer skin. It presents a further advantage of allowing a fuselage to be executed, in any shape whatever, without seams.

This technique may include the following operations:
assembly of a plurality of frames and structural parts in order to form the internal framework of the fuselage,
installation of shell fixtures between the frames of the framework to obtain a solid structure (these shell fixtures may apply to more than two frames),
deposit of a layer of composite material around the solid structure,
firing of the solid structure covered with a layer of composite material, and
removal of the shell fixtures to obtain the internal framework covered with the outer skin.

The technique of the disclosed embodiments may also include one or several of the following characteristics:

the layer of composite material is laid down in the form of a strip of fibers impregnated with a resin.

the frames of the internal framework are prefabricated.

the prefabricated frames are installed in one piece.

The shell fixtures are fastened onto the frames located on either side of said shells.

the shell fixtures are portions of cylinders.

the frames are mounted on a frame structure capable of supporting the internal framework.

the frame structure is capable of setting the internal framework in rotation for a device for laying down the composite material.

the shell fixtures are removed from inside the framework after having been disconnected from the internal framework.

openings are cut in the outer skin for the placement of doors and/or windows in the fuselage.

the shell fixtures are covered with a material promoting their unmolding.

the shell fixtures are executed in an anti-adhesive material, the shell fixtures are executed in a material such that its thermal expansion is roughly no different from that of the outer skin.

The disclosed embodiments also concern an aircraft fuselage obtained by the technique previously described.

This fuselage may in addition be characterized by the fact that the outer skin may be glued onto the frames forming the internal framework.

DETAILED DESCRIPTION OF THE DISCLOSED EMBODIMENTS

The technique of the disclosed embodiments offers the execution of an aircraft fuselage, or of a section of an aircraft fuselage, in which the internal framework of the aircraft comprises at least one part of the mold and/or the support of said mold for fabricating the outer skin in a composite material. Throughout the following description, the fabrication of an aircraft fuselage is considered as a whole, it being understood that the technique may be implemented to execute only one section of the aircraft fuselage. When only one section of the fuselage is executed, this section can be assembled and fastened to other sections made of composite materials or of metal.

The technique according to the disclosed embodiments consists of fabricating the internal framework of the fuselage starting with frames and other structural parts, generally of metal. These frames and these pieces are put together and then fastened to one another to form the internal framework. The assembly of these different pieces is executed around a chuck resting on a frame structure. This chuck has the role of supporting the internal framework and allowing said framework to be set in rotational motion at the time of fabricating the outer skin. This role of setting in rotation will be described in more detail below.

Figure 1:
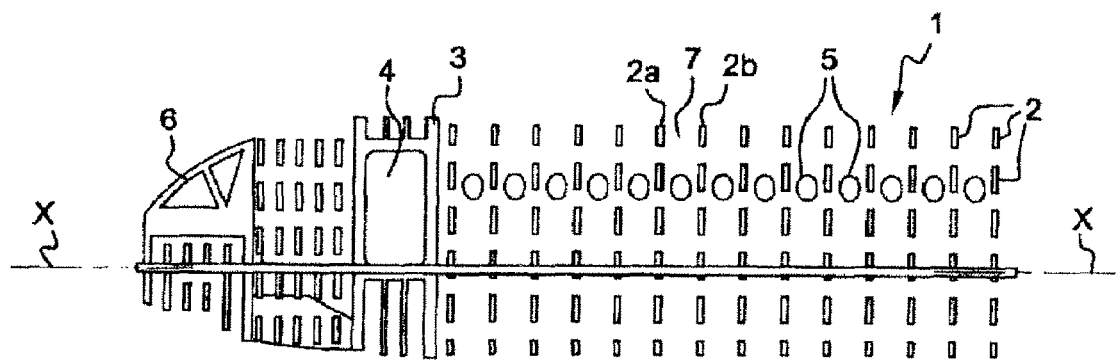
FIG. 1 represents an internal aircraft framework according to the technique of the disclosed embodiments.

FIG. 1 depicts, schematically, the step of assembly and putting the internal framework of a fuselage together, in accordance with the technique of the disclosed embodiments. FIG. 1 represents an internal framework 1 assembled around an axis XX supporting the chuck. The chuck is not depicted in the figure by way of simplification. Only the axis XX is represented, the chuck being around this axis. The axis XX is fixed on either side of the supports forming a support frame for the internal framework, not depicted in the figure by way of simplification. This axis XX can also be in a vertical position, and may be fixed just at its lower end, in that case. This internal framework 1 includes frames 2, beams, stringers, decking, and other structural panels. It includes, for example, preassembled subassemblies 3 whose cutouts are intended to received doors 4, windows 5, or even the appointments of the flight deck 6.

As shown in FIG. 1, when the various elements of the internal framework are assembled and put together, the general shape of the fuselage of the aircraft is perceptible. In order to facilitate the installation and assembly of the internal framework, the various pieces intended to form the internal framework, and in particular the frames, can be numbered and marked on a plan.

Likewise to facilitate the construction of the internal framework, the structural parts and other frames may be prefabricated parts. The frames can be installed in one piece, which simplifies the installation of the various parts of the internal framework. For example, the frames can be executed 360° around.

Figure 2:
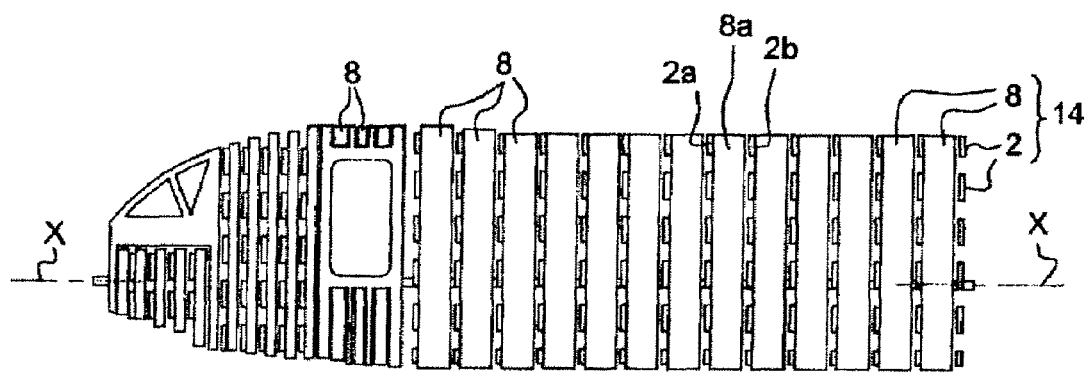
FIG. 2 represents a solid aircraft structure (that is, provided with shell fixtures) executed according to the technique of the disclosed embodiments starting with the internal framework of FIG. 1.

When the internal framework is assembled, the technique of the disclosed embodiments includes an operation of installing shell fixtures between the frames of the internal framework. Indeed, the frames and other structural parts are spaced apart from one another. In the example of FIG. 1, the frames 2a and 2b are separated by a space 7. The technique of the disclosed embodiments offers to fill these spaces by means of shell fixtures which form a covering for the internal framework. An example of an internal framework covering is depicted in FIG. 2. FIG. 2 shows the internal framework 1 of FIG. 1 after installation of shell fixtures 8 between the frames 2 and structural parts of said framework.

The shell fixtures 8 are parts having a curvature identical to the outside curvature of the internal framework. In other words, the shell fixtures 8 constitute surface portions capable of being installed between two frames or two frame sets of the framework. The shell fixtures may have dimensions roughly equal to the space between two frames. In this case, each shell fixture is installed and fastened between two frames. The shell fixtures may also have dimensions greater than the space between two frames. In that case, each shell fixture can be installed between two frame sets. In the example of FIG. 2, a shell fixture 8a has the shape of a half-cylinder. This shell 8a is then installed between a first frame 2a and a second frame 2b. This shell 8a therefore continues over the frames 2a to 2b. A shell fixture can thus be installed in an interframe, that is, in a space between two frames, or else in a space comprising more than an interframe. In the following description, each shell fixture will be considered to be installed between two frames.

The shell fixtures can form a portion of a cylinder. They can also have any other shape that allows them to follow the contours of the outer shape of the internal framework. When the shell fixtures are installed over the entire surface area of the internal framework, the structure obtained is called a solid structure 14. This solid structure 14 is therefore an internal framework whose spaces are filled with the shell fixtures. This solid structure may include some openings that correspond to specific appointments of the aircraft, such as the doors or the windows of the flight deck.

Figure 3:
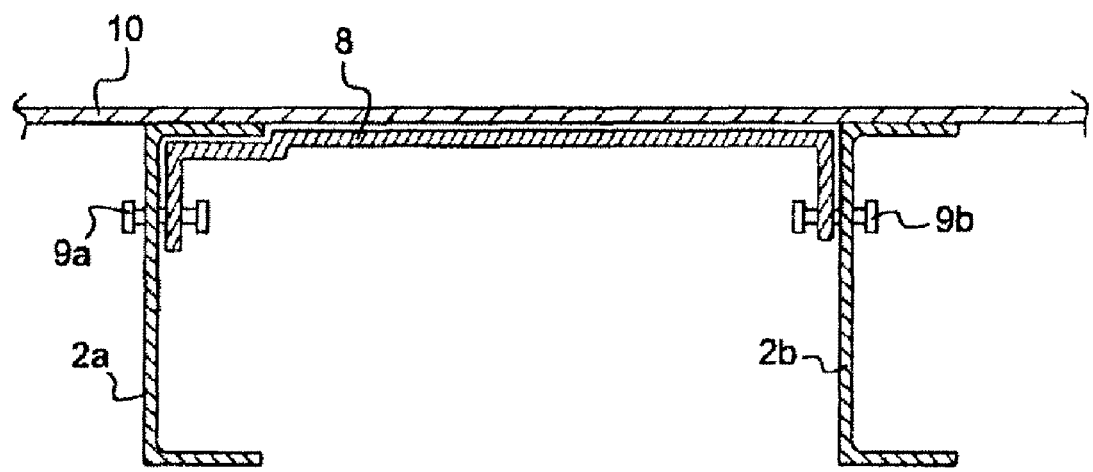
FIG. 3 represents a partial sectional view of an internal framework and a shell fixture.

FIG. 3 depicts a partial sectional view of a solid structure. FIG. 3 therefore shows, according to a frontal section view, two frames 2a, 2b of an internal framework 1 between which is installed a shell fixture 8. This shell fixture 8 is fastened onto each frame 2a and 2b by means of a detachable fastener 9a, 9b. This detachable fastener may be a bolt or any other means of fastening able to ultimately be removed, after fabrication of the outer skin 10. The shell fixture 8 may also be set in position at the frames 2a, 2b but fastened onto another part of the internal framework 1.

In the example of FIG. 3, the frames 2a, 2b have the rough shape of a C. The shell fixture 8 has a shape adapted for being inserted between the back of the C of the frame 2b and the base of the U of frame 2a.

The shell fixture 8a may be executed in several parts in order to promote its insertion between the frames 2a and 2b. In this case, it is a matter of the assembly and then the disassembly of the shell fixtures.

In the example of FIG. 3, the outer skin 10 is pictured which covers the frames 2a and 2b as well as the shell fixture 8. FIG. 3 therefore corresponds to the solid structure after fabricating the outer skin and before removing the shell fixtures. The operation of fabricating the outer skin and of removing the shell fixtures will now be described.

When the solid structure 14 is constructed, the technique of the disclosed embodiments offers the execution of the outer skin around said solid structure. The solid structure 14 thus constitutes a mold for fabricating the outer skin. In other words, the internal framework constitutes one part of the mold for fabricating the outer skin. The other part of the mold for fabricating the outer skin is composed of the shell fixtures, this other part being removed after fabricating said outer skin.

In order to execute the outer skin, strips of fibers pre-coated with resin are placed all around the solid structure. These pre-coated fiber strips are laid down, band by band, over the entire contour of the solid structure.

Figure 4:
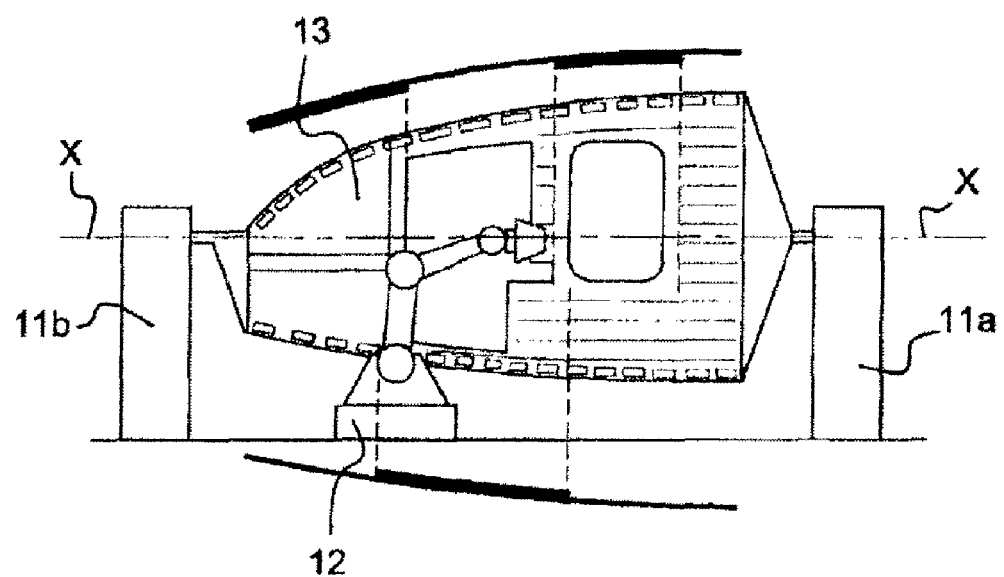
FIG. 4 schematically represents a portion of an aircraft fuselage executed according to the technique of the disclosed embodiments, when the solid structure is covered with one strip of pre-coated fibers.

In FIG. 4, an example is depicted of a fuselage section installed on the frame structure 11 of a fiber-laying machine. As explained above, the internal framework was constructed around an axis XX resting on two supports 11a and 11b forming the frame structure 11 of the fiber-laying machine. The solid structure, once executed, is then assembled around the axis XX. The supports of the frame structure 11 are equipped with motors which allow the axis XX to be set in rotation. The solid structure is thus set in rotation by the axis XX.

A placement head, 12, movable, provides for laying the strip of pre-coated fibers on the solid structure. The solid structure is thus covered, band by band, with a layer of pre-coated fibers 13. When the solid structure is entirely covered with pre-coated fibers, said structure is put into a furnace to be fired. Under the effect of heat, the resin polymerizes so that the strips 13 create a laminate following the contours of the shape of the solid structure and constituting the skin 10.

It should be noted that the shell fixtures are executed in a material such that their thermal expansion is roughly no different from that of the fiber strips. They may be executed, for example, in a composite material. The firing of the solid structure therefore does not cause any problem in differential thermal expansion between the shell fixtures and the internal framework. In addition, the internal framework no longer creates thermal-expansion problems, because it is made of composite materials. The firing of the solid structure therefore only affects the strip of pre-coated fibers.

When the fiber strip is polymerized, the outer skin is shaped. The technique of the disclosed embodiments then offers the removal of the shell fixtures.

In a preferred embodiment, the shell fixtures are covered with a material that promotes their unmolding, that is, a material which prevents any adherence of the resin. In one variant, the shell fixtures are executed in an anti-adhesive material. Thus, the outer skin, once fabricated, is glued to the internal framework, and in particular to the frames of the internal framework, but is not glued to the shell fixtures. The shell fixtures may therefore be disconnected and then easily removed, from the inside of the framework, while leaving said internal framework in place, on the inside of the outer skin.

When the shell fixtures have been removed, cutouts can be made in the outer skin to obtain openings intended for the windows, the doors, and other appointments.

It is therefore understood that this technique allows a considerable time savings, since the internal framework is executed before the outer skin is in place. It is therefore achieved without space constraint. Moreover, this technique necessitates only the layout and removal of shell fixtures which can be, respectively, in several parts in order to be removed more easily.

In addition, a fuselage obtained by the technique of the disclosed embodiments presents the advantage of being able to be executed in one piece, without the need for a seam between two panels, which allows a savings in time and in weight and a considerable improvement in the aerodynamics of the aircraft.

The invention claimed is:

1. A method of fabricating an aircraft fuselage comprising an internal framework which at least partially comprises a mold for fabricating an outer skin made of composite material, the internal framework being wrapped with an outer skin of composite material, the method comprising the following sequential steps:
    assembling a plurality of frames and structural parts together, directly around a chuck resting on a frame structure to form the internal framework of the fuselage,
    installing shell fixtures in a space between at least two frames of the internal framework and fastening each of the shell fixtures onto the two frames by means of detachable fastening, to fill spaces between frames and obtain a solid structure
    depositing a layer of composite material around the solid structure,
    firing the solid structure covered with the layer of composite material, and
    removing the shell fixtures to obtain the internal framework covered with the outer skin .

2. The method according to claim 1, wherein the layer of composite material is laid down in the form of fibers impregnated with a resin.

3. The method according to claim 1, wherein the frames of the internal framework are pre-fabricated.

4. The method according to claim 3, wherein the pre-fabricated frames are installed in one piece.

5. The method according to claim 1, wherein the shell fixtures are fastened onto the frames located on either side of said shell fixtures.

6. The method according to claim 1, wherein the shell fixtures are portions of cylinders.

7. The method according to claim 1, wherein the shell fixtures are executed in several parts, which promotes their insertion between the frames.

8. The method according to claim 1, wherein the frames are mounted on a frame structure capable of supporting the internal framework.

* * * * *